Figure 1:
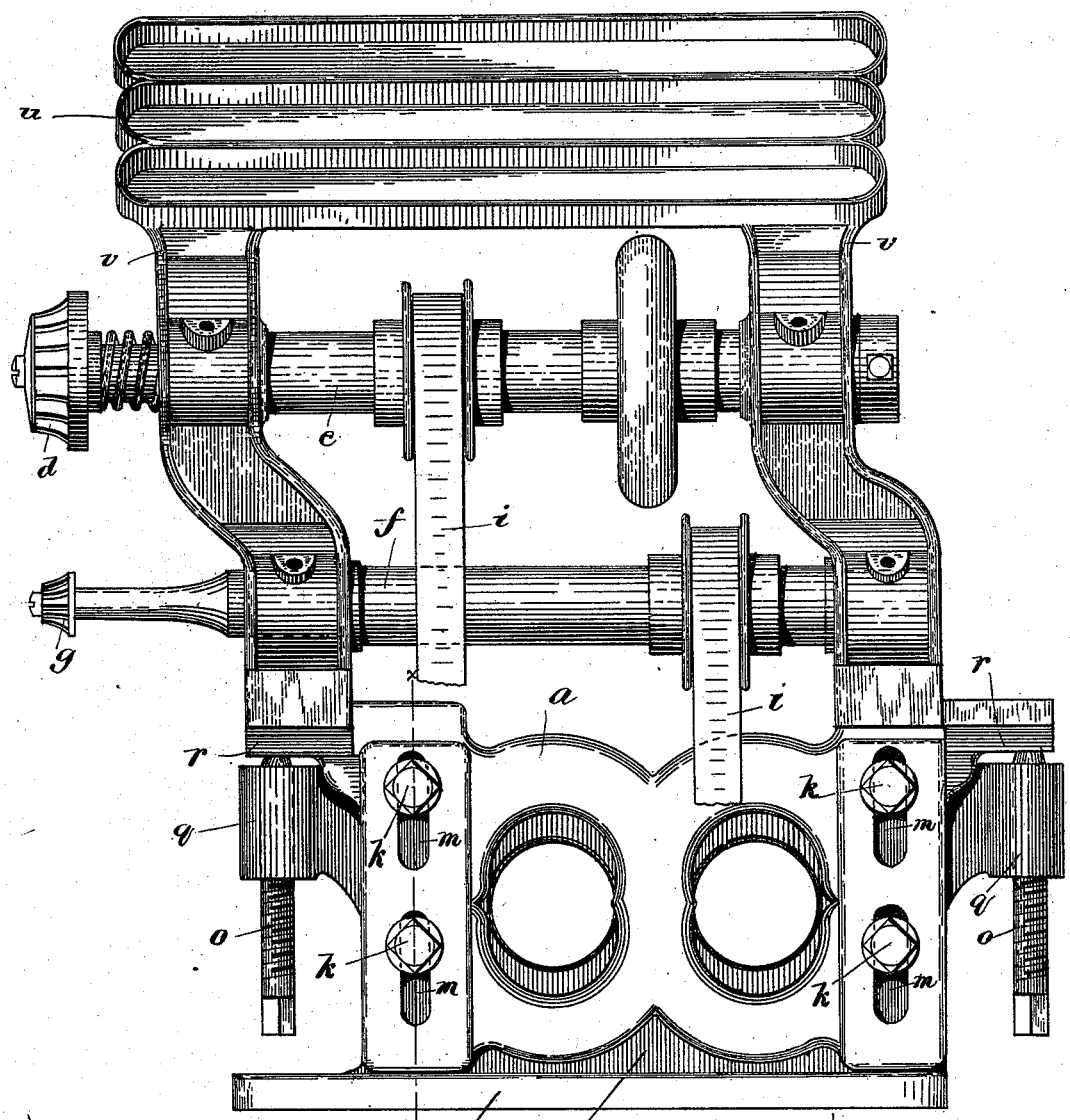

(No Model.) 2 Sheets—Sheet 1.

W. LAHEY.
BELT TIGHTENER FOR SOLE EDGE TRIMMING MACHINES.

No. 402,250. Patented Apr. 30, 1889.

WITNESSES.
H. Brown
A. D. Hanson

INVENTOR.
Wm Lahey
by Wright Brown Quimby
Attys.

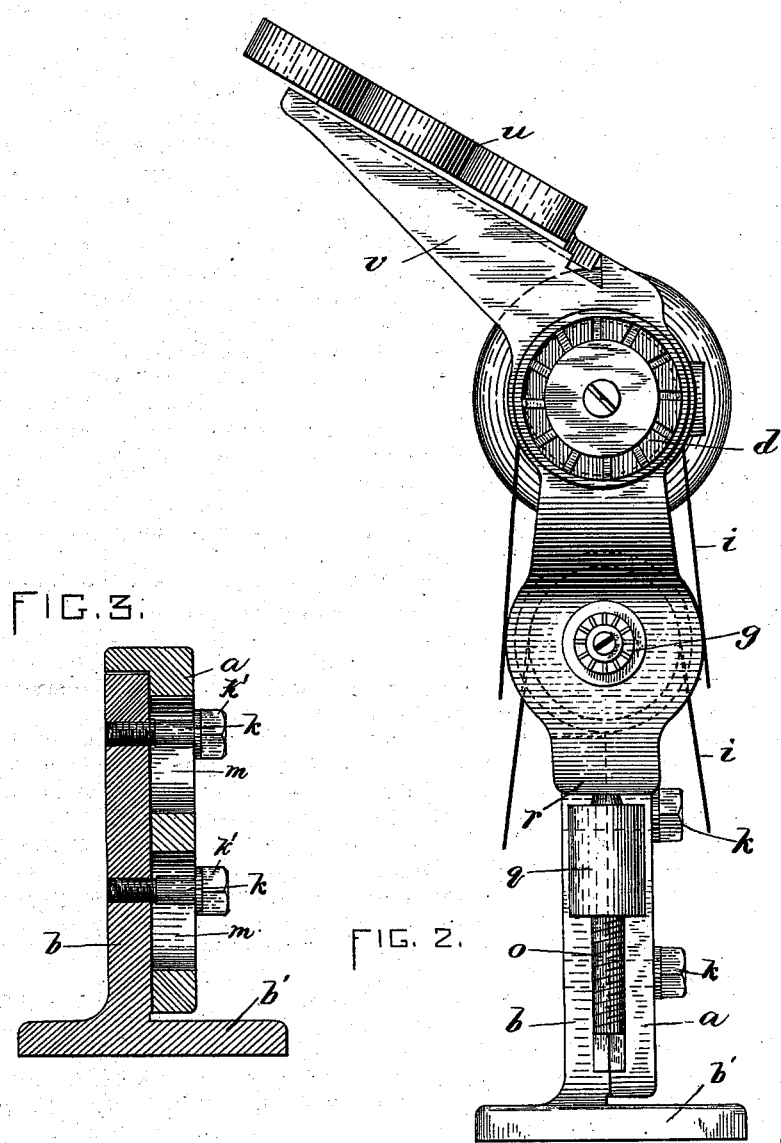

UNITED STATES PATENT OFFICE.

WILLIAM LAHEY, OF STONEHAM, MASSACHUSETTS.

BELT-TIGHTENER FOR SOLE-EDGE-TRIMMING MACHINES

SPECIFICATION forming part of Letters Patent No. 402,250, dated April 30, 1889.

Application filed June 30, 1888. Serial No. 278,670. (No model.)

*To all whom it may concern:*

Be it known that I, WILLIAM LAHEY, of Stoneham, in the county of Middlesex and State of Massachusetts, have invented certain new and useful Improvements in Belt-Tighteners for Sole-Edge-Trimming Machines, of which the following is a specification.

This invention relates to belt-tighteners for sole-edge-trimming machines employing rotary cutters. In such machines the shafts to which the cutters are affixed are driven at a high rate of speed, and to enable the driving-belts to properly transmit the motion from a driving-shaft it is necessary that the belts be kept taut, as any considerable stretching and slackening of the belts will cause them to slip on the pulleys. The high rate of speed at which the cutters are driven prevents the employment of belt-tightening devices, which act by pressing against a belt to take up the slackness caused by the stretching of the belt, as the pressure of such a device against the belt of a machine of this class would cause an undesirable jar and vibration. It has therefore been necessary heretofore to shorten the belts whenever they become stretched to such an extent as to slip, the ends of the belt having to be separated and afterward reunited at a considerable inconvenience and loss of time.

My invention has for its object to enable an operator to readily tighten the belts of a sole-edge-trimming machine without the use of belt-tighteners and without shortening the belts. To this end the invention consists in a sectional supporting-frame for the shaft or shafts on which the rotary cutters are located. One section of said frame has the bearings in which said shafts rotate, and is adjustable on the other section, so that the shafts may be raised from time to time to tighten the belts, means being provided for positively holding the adjustable section in any position to which it may be adjusted, as I will now proceed to describe.

Of the accompanying drawings, forming a part of this specification, Figure 1 represents a front elevation of a sole-edge-trimming machine embodying my invention. Fig. 2 is an end elevation thereof. Fig. 3 represents a section on line $x\,x$, Fig. 1.

The same letters of reference indicate the same parts in all the figures.

In the drawings, $a\,b$ represent the sections of the frame of a sole-edge-trimming machine, the section $b$ being the supporting-section, and adapted by means of a base, $b'$, or otherwise, for attachment to a fixed support. The section $a$ has the bearings for the shaft $c$ to which the edge-trimming cutter $d$ is attached, and for the shaft $f$, having the shank-trimmer $g$, and is vertically adjustable on the fixed section $b$, so that the shafts $c\,f$ may be raised for the purpose of tightening the belts $i\,i$, which communicate motion to said shafts from a driving-shaft. (Not shown.)

The means for positively holding the section $a$ at any position to which it may be adjusted are bolts $k\,k\,k$, screwed into the fixed section and passing through vertical slots $m$ in the adjustable section $a$, (the heads of said bolts having clamping-nuts $k'$ bearing on the adjustable section,) and supporting-screws $o\,o$, engaged with tapped sockets in lugs $q\,q$, formed on the fixed section $b$, and bearing at their upper ends against shoulders $r\,r$ on the section $a$.

It will be seen that when the bolts $k$ are loosened the section $a$ may be raised by the rotation of the screws $o\,o$ to any desired extent, the section $a$ being rigidly clamped against the section $b$ after adjustment by tightening the bolts.

$u$ represents an inclined rack or holder, which is attached to arms $v\,v$ on the section $a$, and is formed to hold spare cutters of different sizes and shapes.

Although I have shown two cutter-shafts mounted in the section $a$, it is obvious that my invention is not limited to an adjustable section having two cutter-shafts, as the number of shafts may be one or more.

I claim—

As an improvement in belt-tighteners, the combination of the stationary section having tapped sockets, the vertically-disposed adjusting-screws, the adjustable section provided with the end shoulders bearing on said vertical screws, and carrying rotary shafts, and having slots and nutted bolts passed through said slots, substantially as set forth.

In testimony whereof I have signed my name to this specification, in the presence of two subscribing witnesses, this 20th day of June, A. D. 1888.

WILLIAM LAHEY.

Witnesses:
C. F. BROWN,
A. D. HARRISON.